United States Patent Office 3,746,702
Patented July 17, 1973

---

3,746,702
PREPARATIVE APPROACH TO 7-LOWER ALKANOYL BENZODIAZEPINES
Robert Ye-Fong Ning, West Caldwell, and Leo Henryk Sternbach, Upper Montclair, N.J., assignors to Hoffmann-La Roche Inc., Nutley, N.J.
No Drawing. Filed May 4, 1970, Ser. No. 34,532
Int. Cl. C07d 53/06
U.S. Cl. 260—239 BD          8 Claims

ABSTRACT OF THE DISCLOSURE

The present invention relates to a process for the preparation of 7-lower alkanoyl benzodiazepines.

RELATED APPLICATIONS

This application relates to Ser. No. 838,677, filed July 2, 1969, abandoned; Ser. No. 877,490, filed Nov. 17, 1969, Pat. No. 3,553,206 issued Jan. 5 1971, both in the names of Pius Anton Wehrli, Rodney Ian Fryer and Leo Henryk Sternbach and Ser. No. 28,935, filed Apr. 15, 1970, now U.S. Pat. 3,686,308, in the names of Robert Ye-Fong Ning and Leo Henryk Sternbach entitled Process for the Preparation of 7-Alkanoyl Benzodiazepines.

DETAILED DESCRIPTION OF THE INVENTION 7-lower alkanoyl benzodiazepines selected from the group consisting of

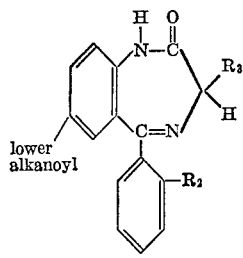

and

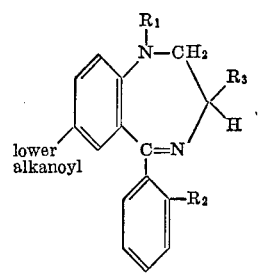

Ia wherein $R_1$ is selected from the group consisting of hydrogen and lower alkyl; $R_2$ is selected from the group consisting of hydrogen and halogen and $R_3$ is selected from the group consisting of hydrogen and lower alkyl.

have been found to be useful as sedatives, muscle relaxants and anticonvulsants. The present invention provides the art with a unique and novel approach to such 7-lower alkanoyl compounds starting with known materials.

More particularly, the present invention relates to a process which involves the treatment of compounds of the formula

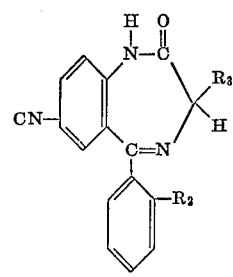

II and

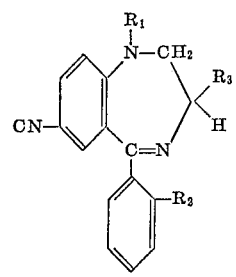

IIa wherein $R_1$, $R_2$ and $R_3$ are as above with a lower alkyl lithium. When proceeding accordingly, there is obtained the corresponding compound of the Formula I or the Formula Ia above.

It is therefore an object of the present invention to provide the art with a method for preparing 7-lower alkanoyl benzodiazepines via the reaction of a lower alkyl lithium with known compounds. Other objects will be clear from the description of the invention which follows.

As is evident from the above, an important aspect of this invention is the finding that a lower alkyl lithium can be utilized to treat a nitrile of the Formula II or IIa above whereby to selectively effect the preparation of the desired compound of the Formulae I or Ia above. As will be recognized, there are many reactive sites on a compound of the Formula II above or the Formula IIa above which possess the capability of being effected when in the presence of a substance such as a lower alkyl lithium. However, it is entirely surprising to find that when treating a compound of the Formulae II or IIa above with lower alkyl lithium, there can selectively occur the conversion of a nitrile group into a lower alkanoyl grouping without such other reactive sites on the molecule being affected.

The above is particularly true since temperature and pressure are not critical to a successful performance of the process discussed above. Thus, it should be understood that the manner of bringing together the reaction partners (the lower alkyl lithium and the compound of the Formulae II or IIa above) is not a primary importance insofar as effecting a successful performance of the process of the present invention and thus, the particular mode for carrying out the reaction is largely a matter of convenience.

In a preferred embodiment, the reaction is carried out in the presence of an inert reaction medium, i.e., an inert solvent. It will be appreciated that the use of a solvent will ordinarily allow the reaction to proceed in a relatively simple manner which avoids the use of extraordinary conditions, extensive equipment and the like.

Inert solvents capable of providing the inert reaction medium suitable for use in the process aspect of the invention include hexamethyl phosphoramide; ethers, such as tetrahydrofuran, methyl ethyl ether, ether and the like; dioxane and similar type solvents or mixtures thereof. An ether such as tetrahydrofuran or ether itself is employed in the most efficacious embodiment.

While as indicated above, temperature is not critical to a successful performance of this process aspect, it is preferred to effect the reaction at temperatures below room temperature, i.e., temperatures from about —70° C. to about 20° C.

In performing the novel process aspect of the present invention, in a preferred aspect, the reaction is effected in a nitrogen atmosphere, although the atmosphere of nitrogen may be replacd by any other atmosphere of an inert gas such as argon, helium or the atmosphere may be dispensed with and still the desired compound of the Formula I or Ia above may be obtained, provided the atmosphere contains no substance which would effect the reaction route.

After the treatment of a compound of the Formula II or IIa above with lower alkyl lithium, the resultant crude product which contains a complex salt is subjected to hydrolyzing conditions utilizing any conveniently available hydrolyzing agent according to conventional procedures. After the hydrolysis is completed, the reaction mixture can be treated according to conventional manipulation techniques to isolate the desired compound of the Formula I or Ia above.

As hydrolyzing agents, there can be utilized a basic hydrolyzing agent or an acidic hydrolyzing agent or a neutral hydrolyzing agent such as water. In a preferred embodiment, there is utilized as the hydrolyzing agent, a dilute mineral acid, e.g., dilute hydrochloric acid, dilute hydrobromic acid, dilute sulfuric acid and the like or an aqueous organic acid such as aqueous acetic acid or a base such as an alkali metal hydroxide such as sodium hydroxide.

Thus, in a preferred aspect, the 7-cyano compound of the Formula II or IIa above is added to an appropriate inert organic solvent, which preferably is tetrahydrofuran. Then, while maintaining the temperature below room temperature, e.g., at temperatures below 0°, there is added to the resultant solution, a lower alkyl lithium contained in an appropriate solvent which may be the same solvent which was utilized to dissolve the 7-cyano compound of the Formula II or IIa above or another appropriate solvent. Preferably, as indicated above, an ether such as tetrahydrofuran or ether is utilized as the solvent mediums for both reactants. The resultant crude is then subjected to hydrolyzing conditions utilizing any suitable hydrolyzing agent (preferably a mineral acid such as hydrochloric acid), capable of effecting hydrolysis in accordance with prior art techniques as noted above. The product of the Formula I or Ia above is then isolated in accordance with the usual purification procedures.

In a particularly preferred embodiment, the lower alkyl lithium utilized is methyl lithium so that there is obtained the 7-acetyl benzodiazepine. However, other lower alkyl lithiums can also be utilized such as ethyl lithium, propyl lithium, butyl lithium, pentyl lithium and the like whereby the corresponding lower alkanoyl radical can be obtained.

As used herein, the term "lower alkyl" comprehends a straight or branched chain hydrocarbon group containing 1–7, most preferably 1–4, carbon atoms in the chain such as methyl, ethyl, propyl, isopropyl, butyl and the like. The term "halogen" as utilized herein is intended to connote all four forms thereof, i.e., chlorine, bromine, fluorine and iodine, unless otherwise specified. The term "lower alkanoyl" represents the acyl moiety of a lower alkanoic acid (i.e., a lower alkyl

grouping) such as acetyl, propionyl, butyryl, isopropionyl, caproyl and the like. Preferably, $R_3$ is hydrogen.

Also, in a preferred embodiment, $R_2$ in the formulae above is hydrogen and fluorine. Suitably, the lower alkanoic group in position-7 of the benzodiazepine of the Formula I or Ia above is acetyl. Thus, the most preferred compounds within the class illustrated in Formula I or Ia above are those which bear an acetyl group in position-7 thereof and have $R_1$ as hydrogen or lower alkyl, preferably methyl, $R_2$ is hydrogen or fluorine and $R_3$ is hydrogen.

As is indicated above, the compounds of the Formula I or Ia above (i.e., the 7-lower alkanoyl benzodiazepin-2-ones and the 7-lower alkanoyl-benzodiazepines) are useful as anticonvulsants, muscle relaxants and sedatives. Such compounds can be formulated into pharmaceutical preparations in admixture with a compatible pharmaceutical carrier and can be administered enterally or parenterally with dosages fitted to suit the exigencies of a pharmacological situation.

The compounds of the Formula I or Ia above can be embodied in pharmacological dosage formulations containing from about 0.5 mg. to about 200 mg. of active substance, with dosage adjusted to species and individual requirements. (Parenteral formulations would ordinarily contain less of the active substance than compositions intended for oral administrations.) The compounds of the Formulae I and Ia can be administered alone or in combination with pharmaceutical acceptable carriers as indicated above in a wide variety of dosage forms.

For example, solid preparations for oral administration can include tablets, capsules, powders, granules, emulsions, suspensions and the like. The solid preparations may comprise an inorganic carrier, e.g., talc, or an organic carrier, e.g., lactose, starch. Additives such as magnesium stearate (a lubricant) can also be included. Liquid preparations such as solutions, suspensions or emulsions may comprise the usual diluents such as water, petroleum jelly and the like, a suspension media such as polyoxyethylene glycols, vegetable oils and the like. They may also contain other additional ingredients such as preserving agents, stabilizing agents, wetting agents, salts for varying the asmotic pressure or buffers. They may also contain, in combination, other therapeutically useful substances.

The following examples are illustrative but not limitative of the present invention. All temperatures are stated in degrees centigrade.

EXAMPLE 1

A solution of 52 mg. (0.20 mmole) of 7-cyano-2,3-dihydro-1-methyl-5-phenyl-1H-1,4-benzodiazepine in 5 ml. of dry tetrahydrofuran under nitrogen, was chilled in powdered dry ice. Through a serum stopper, 0.50 ml. (0.8 mmole) of a 1.55 M solution of methyl lithium in ether was injected in one portion. The mixture was stirred for 10 minutes at the dry ice temperature, then decomposed by pouring with stirring into 40 ml. of 0.1 N hydrochloric acid. After 5 minutes at room temperature, the aqueous solution was basified to pH of about 9 with 1 N sodium hydroxide and the product isolated by extraction with methylene chloride. Evaporation of methylene chloride gave a yellow oil, which crystallized from methylene chloride-hexane, giving 7-acetyl-2,3-dihydro-1-methyl-5-phenyl-1H-1,4-benzodiazepine as yellow prisms, M.P. 90–110°.

As in this Example 1, if ethyl lithium is utilized 7-propionyl-2,3-dihydro-1-methyl-5-phenyl-1H-1,4 - benzodiazepine can be obtained.

Also, if propyl lithium is reacted with 7-cyano-2,3-dihydro-5-phenyl-1H-1,4-benzodiazepine as in this example, 7 - butyryl-2,3-dihydro-5-phenyl-1H-1,4-benzodiazepine can be obtained.

EXAMPLE 2

A solution of 130.6 mg. (0.50 mmoles) of 7-cyano-1,3-dihydro-5-phenyl-2H-1,4-benzodiazepin-2-one in 20 ml. of dry tetrahydrofuran under nitrogen, was chilled in powdered dry ice. Through a serum stopper, 1.00 ml. (1.5 mmoles) of a 1.55 M solution of methyl lithium in ether was injected in one portion. The mixture was stirred for 0.5 hr. at the dry ice temperature, then decomposed by pouring with stirring into 50 ml. of 0.1 N hydrochloric acid. After 10 minutes at room temperature, the mirky solution was basified to about pH 8 with 1 N sodium hydroxide and the product isolated by extractions with methylene chloride. Upon crystallization from ether 7-acetyl-1,3-dihydro - 5 - phenyl-2H-1,4-benzodiazepin-2-one was obtained in a yellow amorphous form, M.P. 186–187°.

As in this example, if ethyl lithium is utilized, 7-propionyl-1,3-dihydro-5-phenyl-2H-1,4 - benzodiazepin-2-one can be obtained.

Also, as in this example, if propyl lithium is utilized, 7-butyryl-1,3-dihydro-5-phenyl-2H-1,4 - benzodiazepin-2-one can be obtained.

EXAMPLE 3

Using 417 mg. (1.5 mmoles) of 7-cyano-1,3-dihydro-5-(2-fluorophenyl)-2H-1,4-benzodiazepin-2-one, 4.00 ml. (6.0 mmoles) of 155 M methyl lithium solution in ether and 30 ml. of dry tetrahydrofuran, an analogous procedure to that described in Example 2 was followed yielding 7-acetyl-1,3-dihydro-5-(2-fluorophenyl)-2H-1,4-benzodiazepin-2-one, which upon crystallization from ether-petroleum ether was obtained as light yellow prisms having a M.P. 211–213°.

We claim:
1. A process for the preparation of a compound selected from the group consisting of compounds of the formula

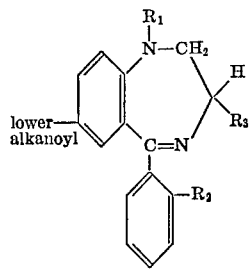

wherein $R_1$ and $R_3$ are selected from the group consisting of hydrogen and lower alkyl and $R_2$ is selected from the group consisting of hydrogen and halogen which comprises treating a compound of the formula

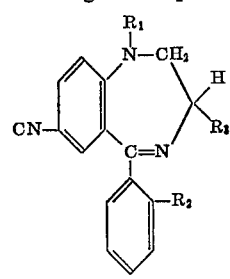

wherein $R_1$, $R_2$, $R_3$ are as above with a lower alkyl lithium.

2. A process as in claim 1 wherein $R_3$ is hydrogen.
3. A process as in claim 2 wherein the lower alkyl lithium utilized is methyl lithium.
4. A process as in claim 1 wherein the lower alkyl lithium utilized is methyl lithium whereby the lower alkanoyl group illustrated in claim 1 is acetyl.
5. A process for the preparation of a compound selected from the group consisting of compounds of the formula

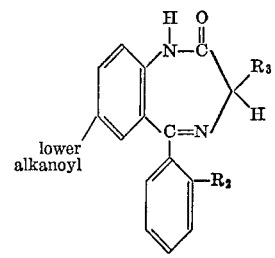

wherein $R_2$ is selected from the group consisting of hydrogen and halogen and $R_3$ is selected from the group consisting of hydrogen and lower alkyl which comprises treating a compound of the formula

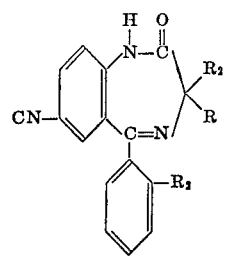

wherein $R_2$, and $R_3$ are as above with a lower alkyl lithium.

6. A process as in claim 5 wherein $R_3$ is hydrogen.
7. A process as in claim 6 wherein the lower alkyl lithium utilized is methyl lithium.
8. A process as in claim 5 wherein the lower alkyl lithium utilized is methyl lithium whereby the lower alkanoyl group illustrated in claim 5 is acetyl.

References Cited

UNITED STATES PATENTS 3,182,054   5/1965   Sternbach et al. _____ 260—239

FOREIGN PATENTS 1,154,315   6/1969   Great Britain ____ 260—239 BD

OTHER REFERENCES

Gilman et al., J. Am. Chem. Soc., vol. 55, pp. 1265–1270 (1933).

Smith, "Open Chain Nitrogen Compounds," Vol. 1, (New York, 1965), p. 214.

ALTON D. ROLLINS, Primary Examiner

U.S. Cl. X.R.

260—239.3D; 424—244

UNITED STATES PATENT OFFICE
CERTIFICATE OF CORRECTION

Patent No. 3,746,702                     Dated July 17, 1973

Inventor(s) ROBERT YE-FONG NING & LEO HENRYK STERNBACH

It is certified that error appears in the above-identified patent and that said Letters Patent are hereby corrected as shown below:

Column 6, claim 5, lines 33-47

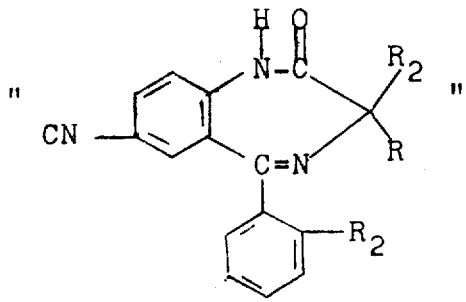

should be

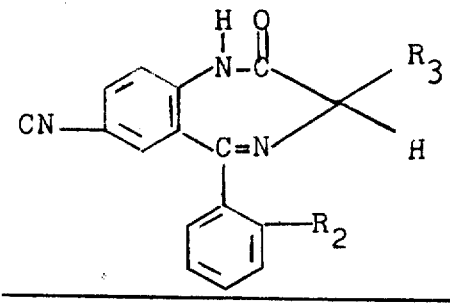

Signed and sealed this 9th day of April 1974.

(SEAL)
Attest:

EDWARD M.FLETCHER,JR.
Attesting Officer

C. MARSHALL DANN
Commissioner of Patents